No. 827,884. PATENTED AUG. 7, 1906.
F. RITTER.
SPADE.
APPLICATION FILED APR. 27, 1905.

Attest:
C. S. Marlton
Edward N. Santon

Inventor
Franz Ritter
By Spear, Middleton, Donaldson & Spear
Att'ys

UNITED STATES PATENT OFFICE.

FRANZ RITTER, OF SERVITUT, NEAR POLNISCH-RASSELWITZ, GERMANY.

SPADE.

No. 827,884.      Specification of Letters Patent.      Patented Aug. 7, 1906.

Application filed April 27, 1905. Serial No. 257,761.

*To all whom it may concern:*

Be it known that I, FRANZ RITTER, a citizen of the German Empire, residing at Servitut, near Polnisch-Rasselwitz, Upper Silesia, Germany, have invented new and useful Improvements in Spades, of which the following is a full, clear, and exact description.

The present invention relates to a novel kind of spade and to means for connecting up two or more such spades together; and it consists of the details of construction hereinafter set forth, and particularly pointed out in the claim.

In order to render the present specification easily intelligible, reference is had to the accompanying drawings, in which similar letters of reference denote similar parts throughout the several views.

Figure 1:
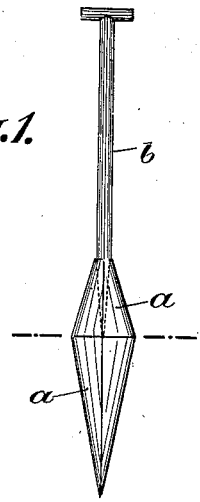
Figure 2:
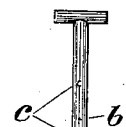
Figure 3:
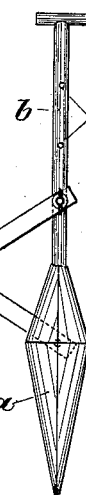
Figure 4:
Figure 4:
Figure 4:
Figure 4:
Figure 4:

Figure 1 is an elevation of the spade; Fig. 2, a cross-section taken on the line 1 1 of Fig. 1; Fig. 3, an elevation of two spades connected up together; Fig. 4, a plan of the holes made by the spades for planting purposes, and Fig. 5 a modified form of connecting up the spades.

Figure 5:
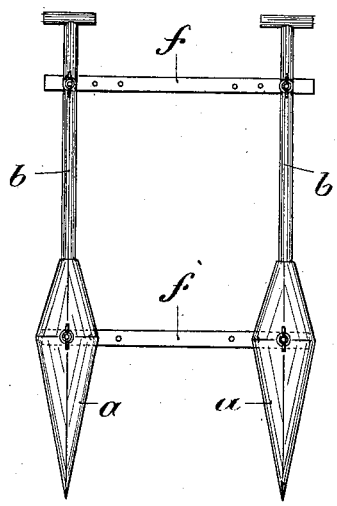

The blade $a$ of the spade is in the form of a dagger, being pointed and composed of two pyramid-shaped parts having their bases placed together, as will be seen from Fig. 2. The handle of the spade may be provided with orifices $c$, and the two spades may be connected together by means of cross-bars $d$ and screws with thumb-nuts, said cross-bars extending either from about the center of the blade $a$ to one of the orifices $c$ of the handle $b$, or the connecting-bars $f$ may be parallel to each other, as shown in Fig. 5, in which case the cross-bars are provided with orifices and are secured to the handle and blade of the spade by means of screws and thumb-nuts. When the spades are thus connected up, the holes for planting purposes may be very regularly and easily made, as will be seen at $e$ in Fig. 4.

This kind of spade is very convenient to handle and cuts well and easily into the soil. The formation of the blade effectually prevents the edges from getting rough and turned or notched.

I claim as my invention—

In combination, two or more implements for making holes in the ground, each implement constituting an independent utensil, crossed stays to connect the said implements together and means for attaching the free ends of said cross-stays at different points in the handles of said implements.

In testimony whereof I affix my signature in the presence of two witnesses.

FRANZ RITTER.

Witnesses:
     LOUIS KATZ,
     ALBERT SCHENK.